Aug. 9, 1932.  W. L. PADEN  1,871,006
COMBINED CASH REGISTER AND ADDING MACHINE
Filed Oct. 6, 1923    11 Sheets-Sheet 11
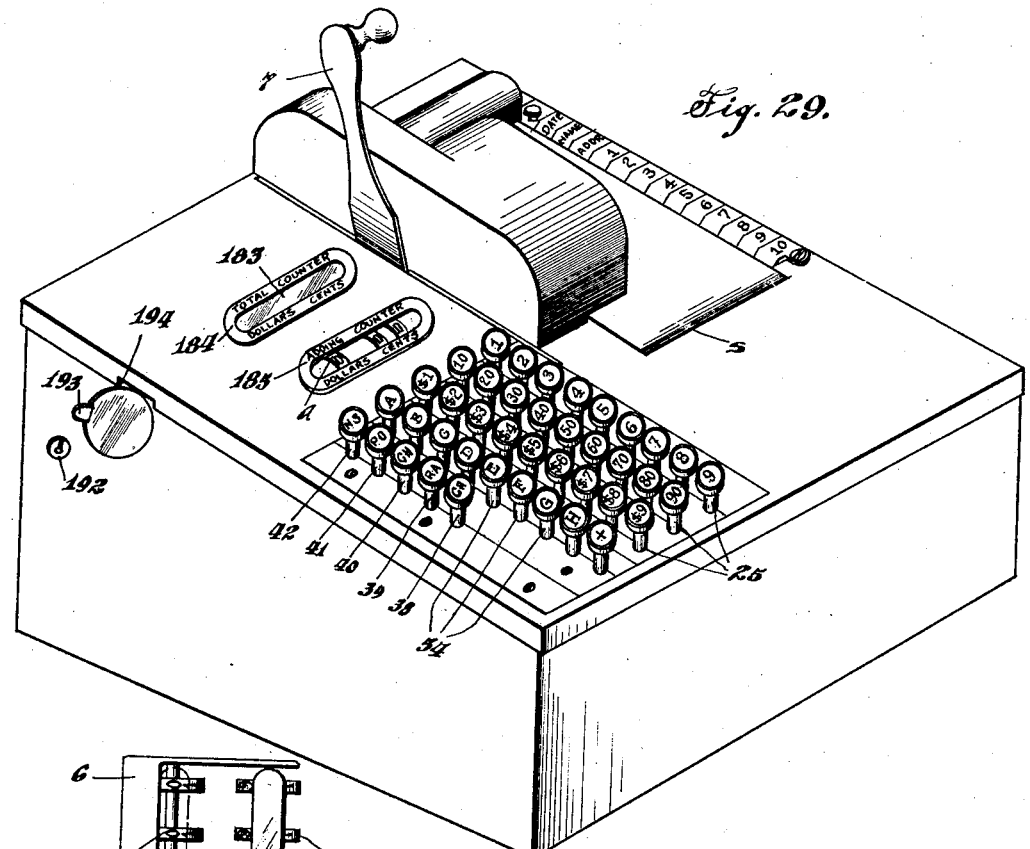
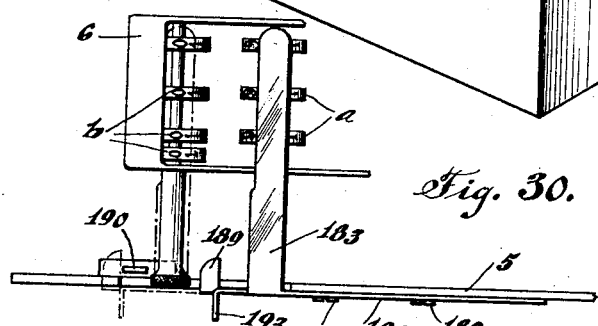
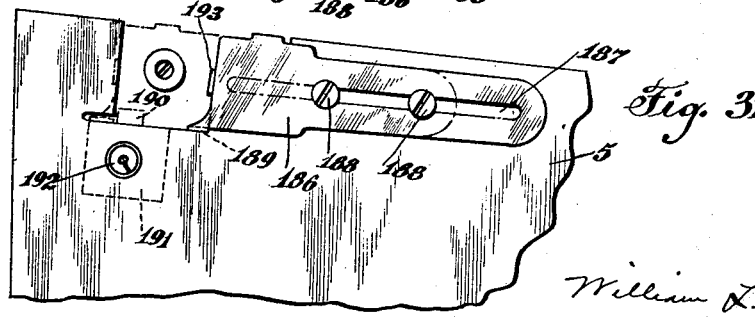

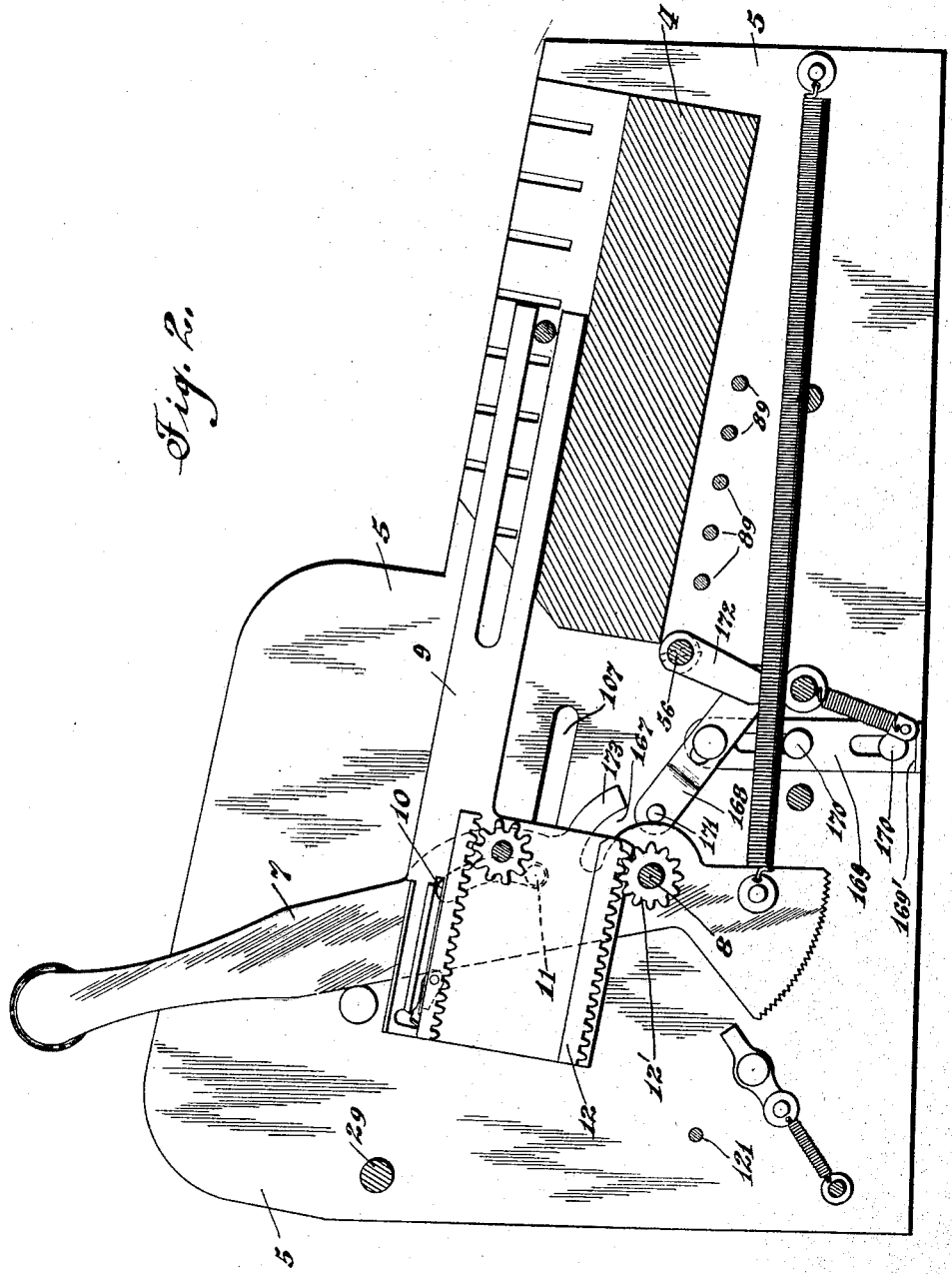

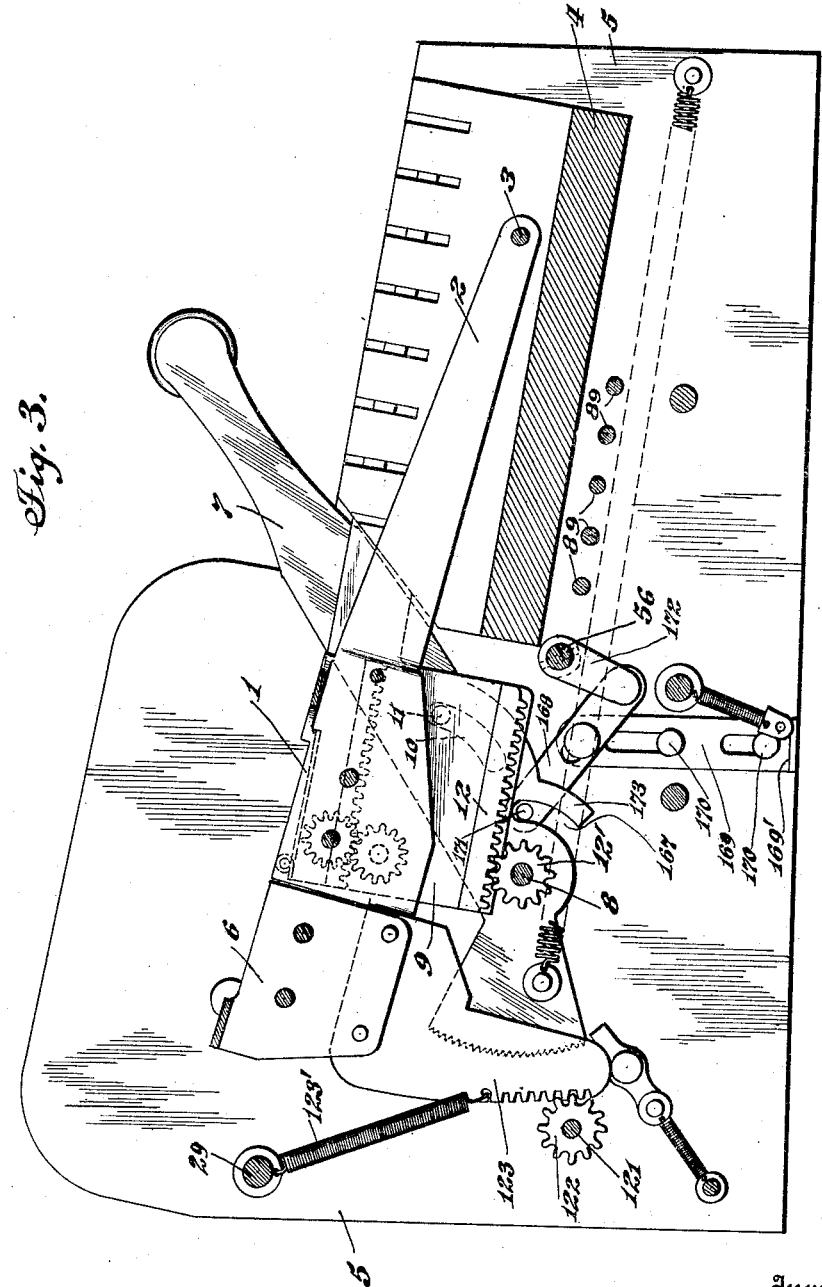

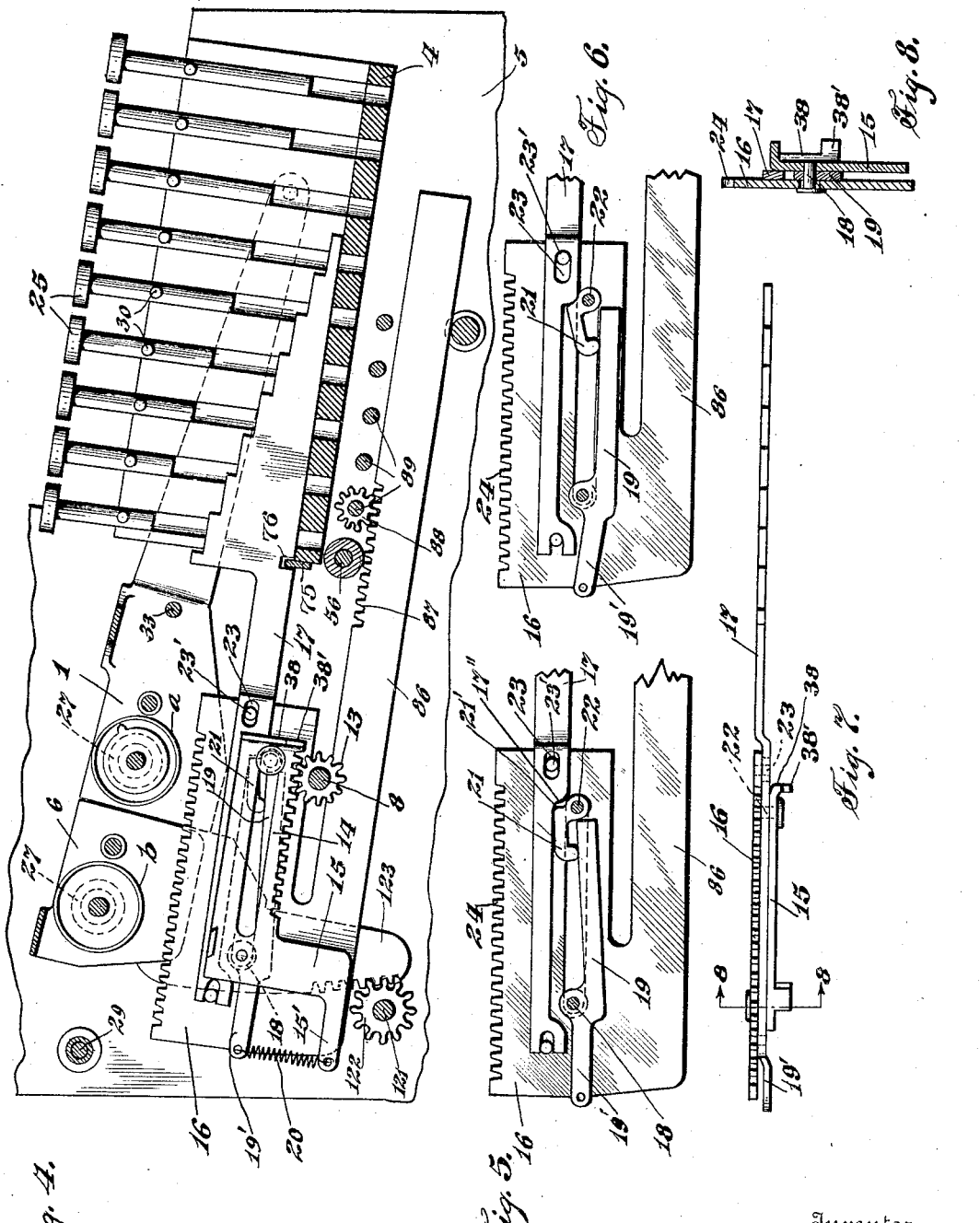

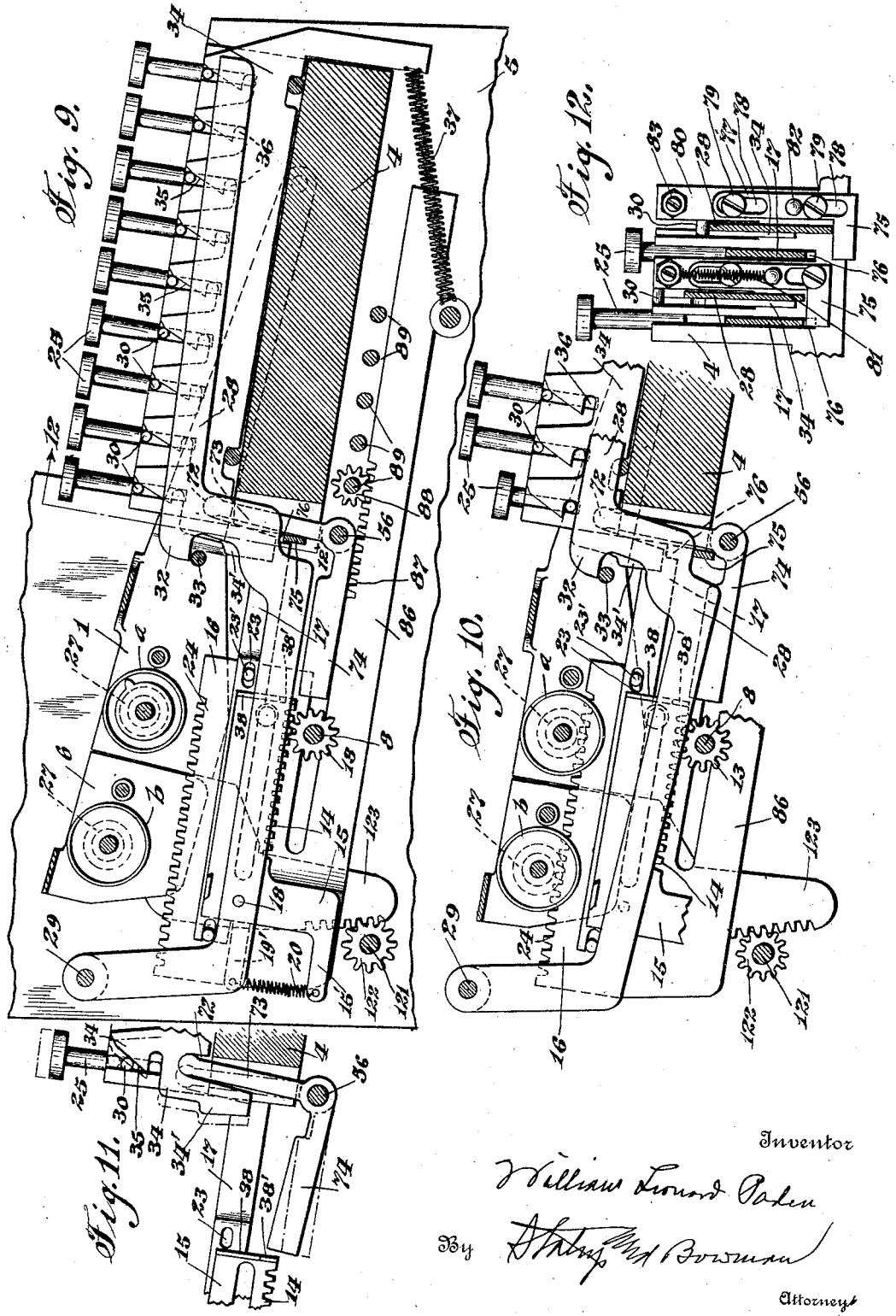

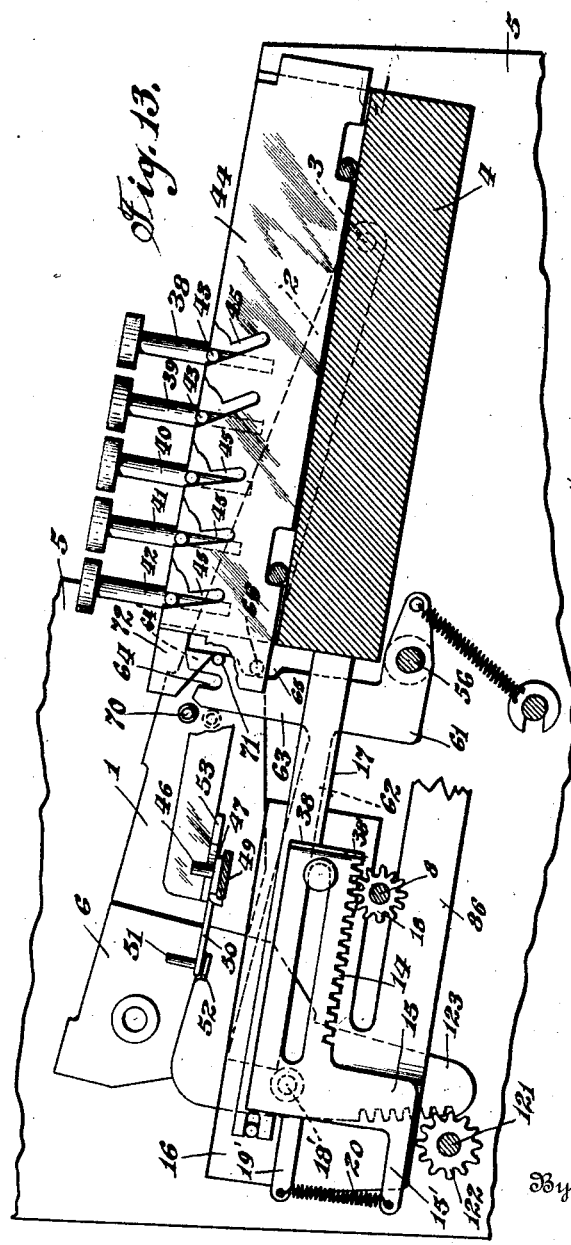

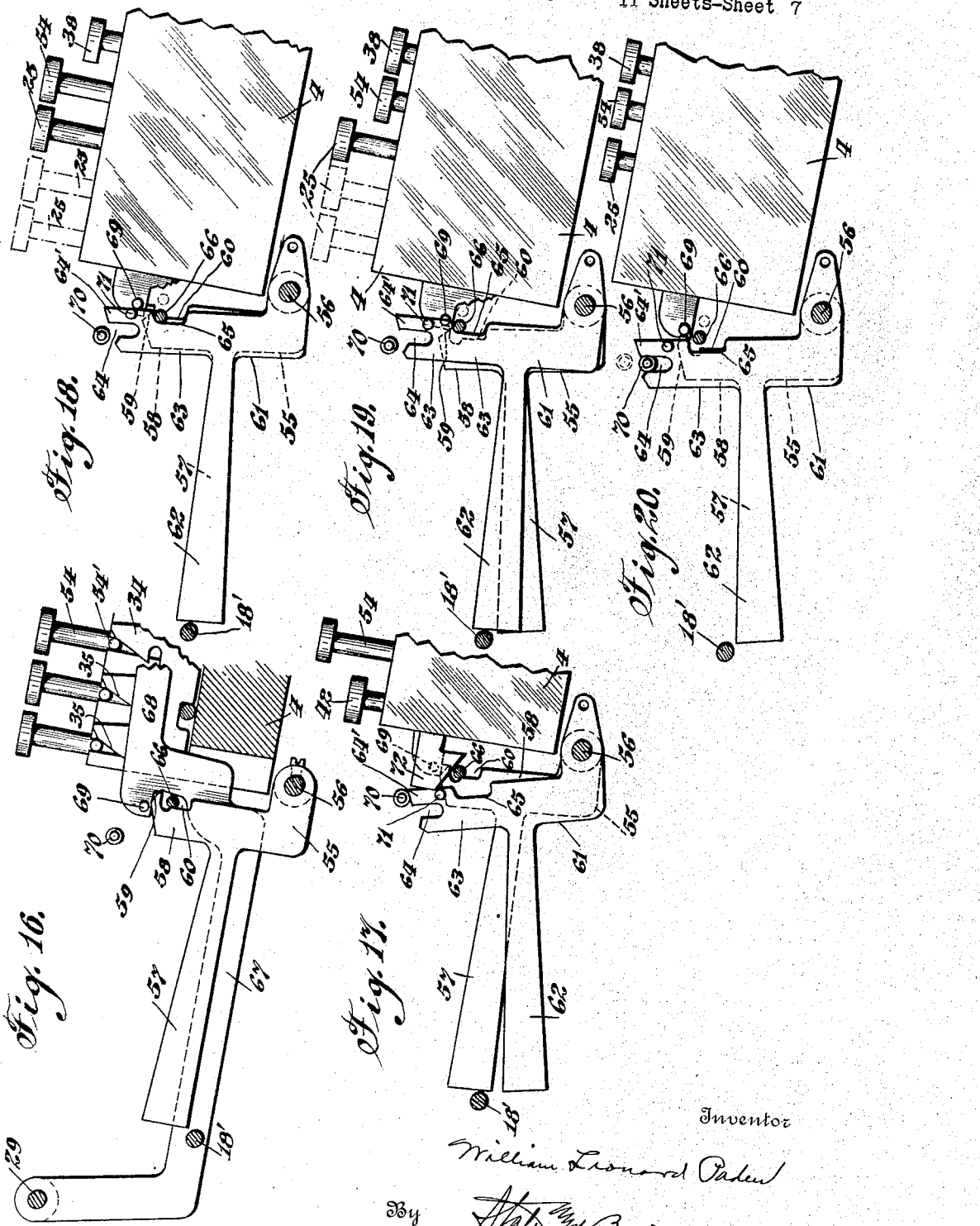

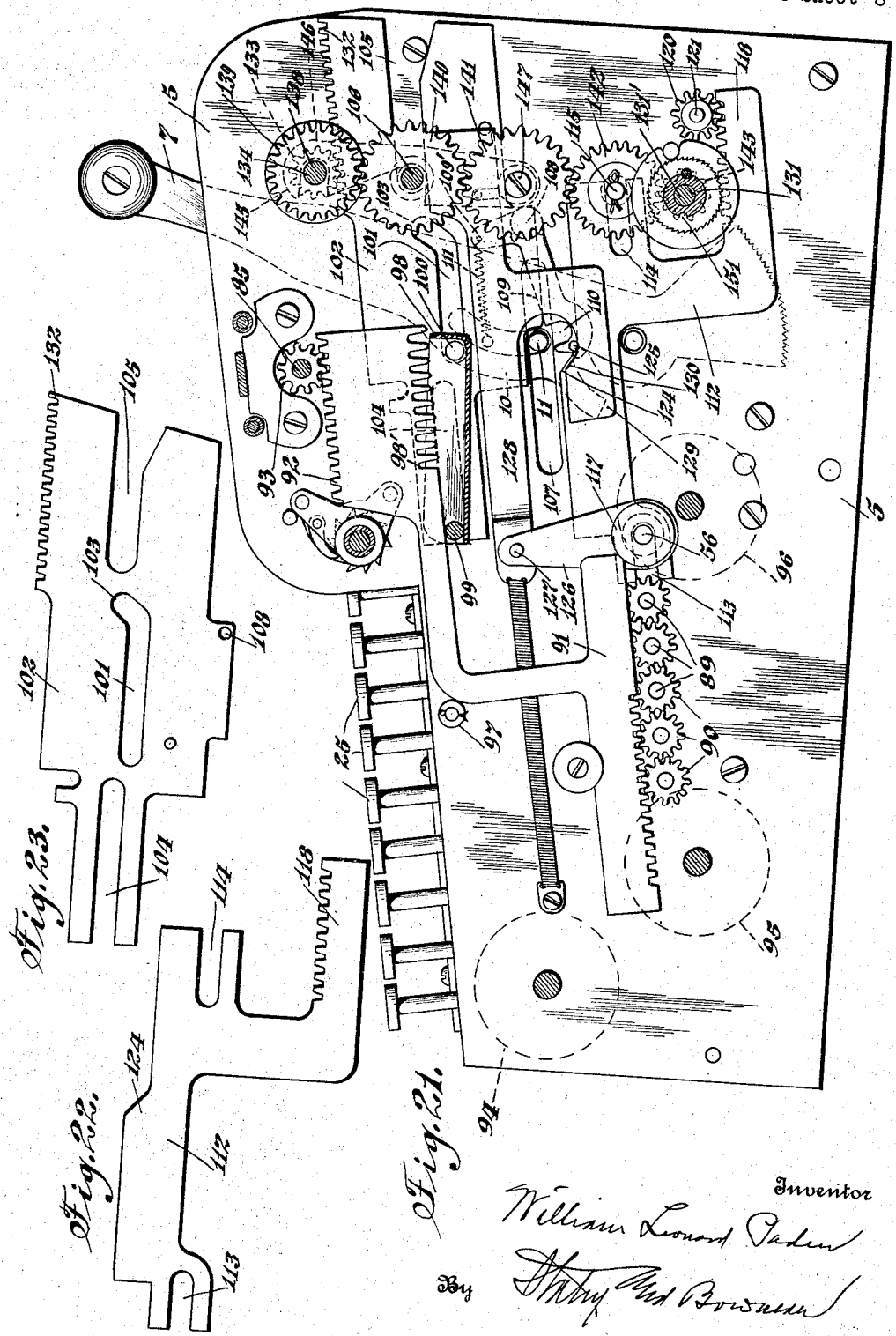

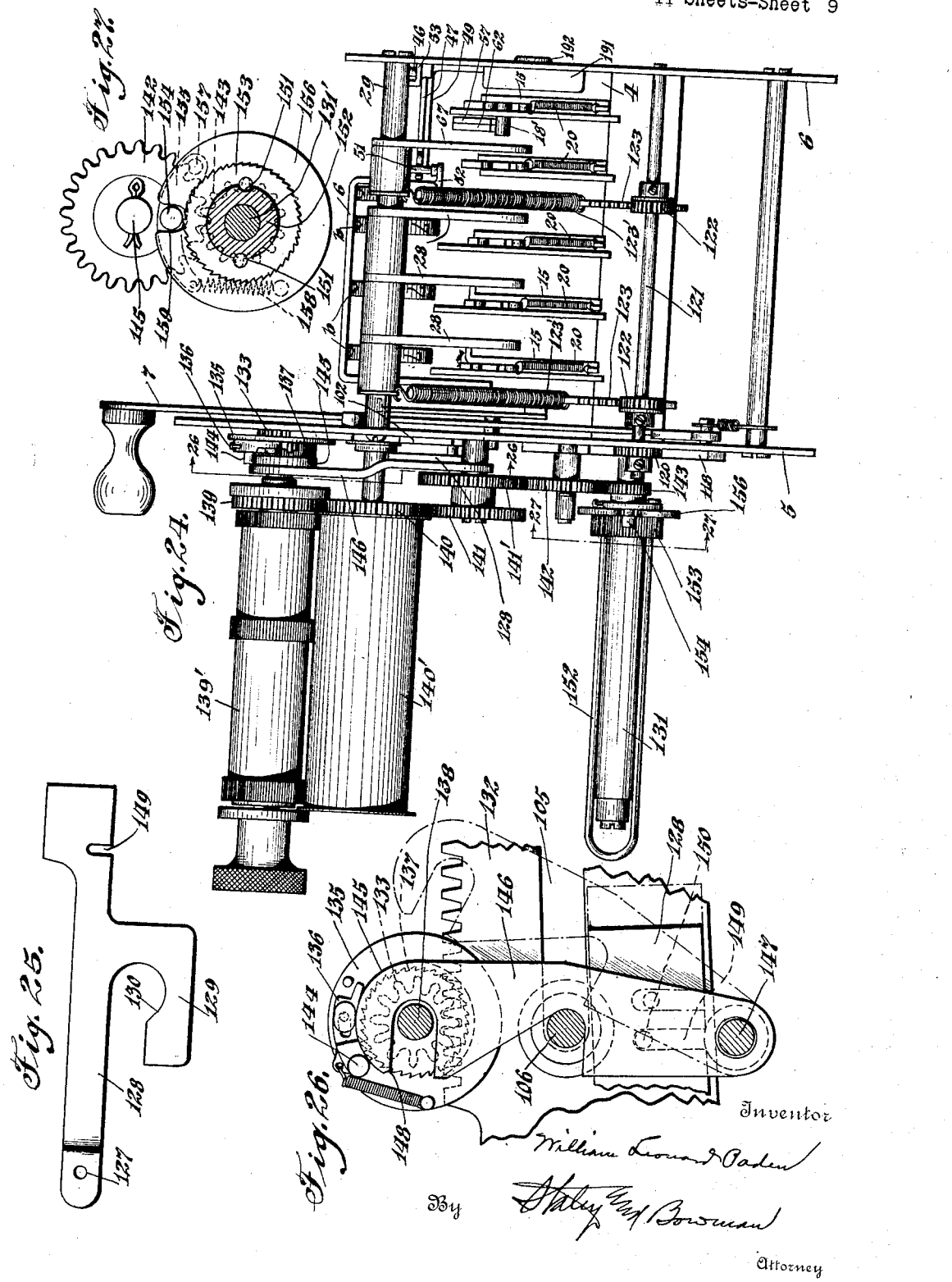

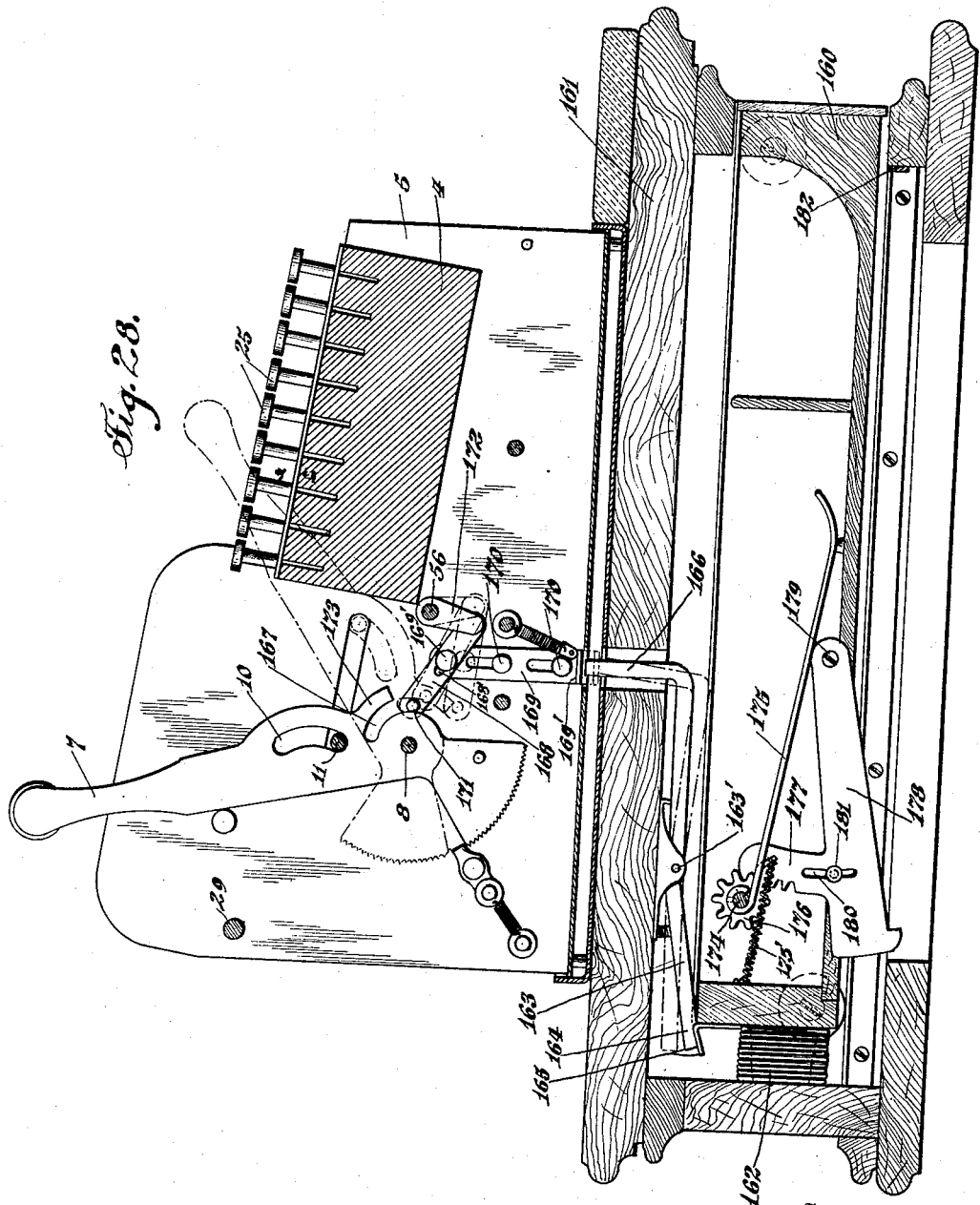

Patented Aug. 9, 1932

1,871,006

UNITED STATES PATENT OFFICE

WILLIAM LEONARD PADEN, OF SAGINAW, MICHIGAN

COMBINED CASH REGISTER AND ADDING MACHINE

Application filed October 6, 1923. Serial No. 666,981.

My invention relates to improvements in a combined cash register, recording and adding machine, it more particularly relating to improvements upon the machine described in my Letters Patent No. 1,848,080, dated March 1, 1932.

An object of the invention is to simplify and make more effective the construction and operation of the machine described in said application, particularly the adding devices.

A further object of the invention is to improve and simplify the counter operating devices, particularly the means for releasing the full-stroke plate from the stop plate and counter actuating plate of each of the counter operating devices when the latter plates have been arrested by a depressed key.

A further object of the invention is to improve the means for depressing the frame which carries the counting devices, holding the same in depressed position and releasing the same at the end of an operation.

A further object of my invention is to provide an arrangement wherein the total adding wheels are normally maintained out of operative position and the detail adding wheels normally maintained in operative position, with the value keys normally free to be manipulated, so that the machine may be used as an adder only without the necessity of first putting the total adders out of commission and also to enable various items of any transaction to be added upon the detail adder as well as being added upon the total adding wheels or totalized on the printer.

In the accompanying drawings:

Fig. 2 is a longitudinal section on the line 2—2 of Fig. 1.

Fig. 3 is a longitudinal section on the line 3—3 of Fig. 1.

Fig. 4 is a longitudinal section on the line 4—4 of Fig. 1, showing one set of the actuating devices for the counters.

Fig. 5 is a side view of a portion of the counter actuating devices with the full stroke plate removed.

Fig. 6 is a view of the same parts shown in Fig. 5, but in a different position.

Fig. 7 is a top plan view of the devices shown in Figs. 5 and 6 but also including the full stroke plate.

Fig. 8 is a section on the line 8—8 of Fig. 7.

Fig. 9 is a longitudinal section on the line 9—9 of Fig. 1.

Fig. 10 is a longitudinal section of some of the parts shown in Fig. 9 showing the position assumed thereby after the depression of a value key.

Fig. 11 is a view of some of the parts shown in the preceding Figures 9 and 10 illustrating the lock for the main operating device during the partial depression of a key.

Fig. 12 is a section on the line 12—12 of Fig. 9 showing the latches to lock the stop plates in zero position during the depression of a value key.

Fig. 13 is a longitudinal section on the line 13—13 of Fig. 1 showing some of the interlocking mechanism and the devices for throwing the total adders into operative position.

Fig. 14 is a similar section with some of the parts eliminated and showing the position assumed by the locking devices upon the depression of a special cash transaction key.

Fig. 15 is a similar section with parts eliminated showing the position of the locking devices upon the depression of the no sale key.

Fig. 16 is a side view of the lock controlled by the clerk's keys.

Fig. 17 is a side view of the locks for the main operating lever controlled by the clerk's keys and also by the special transaction keys with particular reference to the no sale key.

Fig. 18 is a side view of the locks for the main operating lever showing the position assumed by the depression of any one of the special transaction keys excepting the no sale key, the cash key being shown depressed in this instance.

Fig. 19 is a side view of the same showing the positions assumed by the locks after the depression of a special transaction key, such as the cash key, and the depression of a clerk's key.

Fig. 20 is a side view of the same parts showing the position assumed by the locking devices after the depression of a special transaction key, clerk's key and a value key.

Fig. 21 is a side view of the machine showing the printing mechanism.

Fig. 22 is a detail of a member of the devices associated with the cash keys for throwing the printing mechanism into operation.

Fig. 23 is a detail of a member of the operating devices which perform the printing operation.

Fig. 24 is a rear view of a portion of the machine showing the printing devices.

Fig. 25 is a detail of a member of the devices for the printing mechanism associated with the special keys.

Fig. 26 is a section on the line 26—26 of Fig. 24 showing more particularly the paper spacing devices.

Fig. 27 is a section on the line 27—27 of Fig. 24 to show more particularly the compensating devices for the paper take-up reel.

Fig. 28 is a longitudinal section with some parts eliminated showing particularly the cash drawer releasing devices and the bill holder of the drawer.

Fig. 29 is a perspective view of the machine as a whole.

Fig. 30 is a plan view of the blind.

Fig. 31 is a side view of the same.

Figure 1:
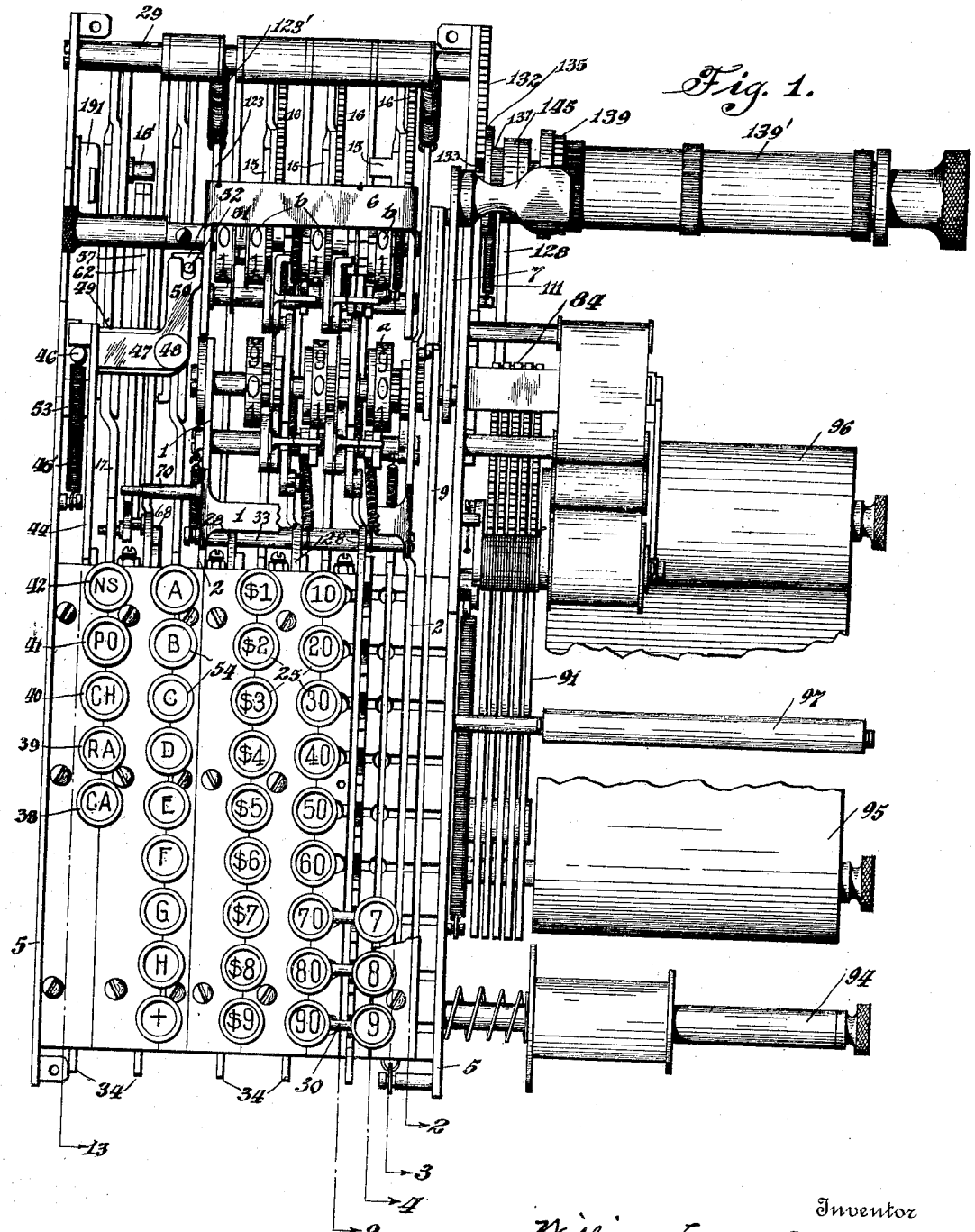
Fig. 1 is a top plan view with the top plate partly broken away and some of the value keys of the unit series removed.

As in my patent referred to, there is employed two sets of adding wheels, one set of these wheels $a$ being used for adding items of any given transaction and also to enable the machine to be used as an adder only which I will call the detail adder, and the other set of wheels $b$ being for the purpose of adding the total transactions of a day's business, which I will call the total adder. Inasmuch as this adding mechanism is exactly the same as that described in my patent referred to, no detail description thereof will be given in this application, it being sufficient to say at present that the adding mechanism is carried by a tiltable frame 1 having forwardly extending arms 2 pivoted as at 3 to a supporting member 4 which in turn is supported by a pair of parallel side plates 5. As in my patent referred to the detail adding wheels are carried by the frame 1 and the total adding wheels $b$ are mounted in a movable sub-frame 6 carried at the rear end of the frame 1. The arrangement of this sub-frame 6, however, differs from the arrangement of my patent referred to in that it is normally positioned so that the adding wheels carried thereby are out of operative relation to the actuating devices and is moved laterally to bring the adding wheels into operative position by the depression of a special transaction key in a manner more fully described hereinafter.

The main operating lever 7 corresponds to the one described in my patent referred to, this lever being pivotally mounted upon the shaft 8 and actuating a main operating slide 9 through the medium of the arcuate slot 10 formed in the lever and lateral pin 11 on the slide. This slide 9 carries a rack 12 meshing with the pinion 12' on the shaft 8, and the shaft 8 has a series of pinions 13 which mesh with the teeth of racks 14 formed on a series of full stroke plates 15, there being one of these full stroke plates for each series of keys represented on the keyboard. As a result of this construction, when the operating lever 7 is drawn forwardly the full stroke plates 15 will be projected forwardly therewith in the manner explained in my patent referred to.

*Device for releasing full-stroke plate.*— Each of the full stroke plates 15 operates a counter actuating plate 16 (see Figs. 4 to 8 inclusive for details). The movement of the counter actuating plates 16 when operated is limited by the depressed keys through the medium of stop plates 17, in the manner explained in my prior patent, each full-stroke plate being connected with its companion counter operating plate by means released by the stop plate. This means in the present application differs from the means employed in my patent referred to and is one of the present improvements. In the present case the full-stroke plate has pivotally connected therewith as at 18 a latch 19, the forward end of which is normally projected by a spring 20 in line with the hub of a pawl 21 which is pivoted as at 22 to the counter operating plate 16; the spring 20 being connected with the tail piece 19' of the latch and a projection 15' of the full-stroke plate 15. The stop plate 17 and counter operating plate 16 are slidably connected together through the elongated slots 23 and pins 23' so that the stop plate will move with the other plates until arrested and then allow the counter operating plate 16 a limited forward movement relatively thereto. The pawl and stop plate have cooperating shoulders 17'' so that when the stop plate is arrested the contact of these shoulders swings the pawl 21 to the position shown in Fig. 6, causing the nose thereof to strike the latch 19 and thus bring the hub of the pawl out of the path of movement of the latch which is allowed to move freely on with the full-stroke plate 15. This arrangement of connecting and disconnecting the counter operating plate 16 with the full-stroke plate is of a more simple and effective character than that described in my patent referred to.

*Means for depressing adding mechanism frame.*—Each of the counter operating plates is provided with rack teeth 24 so that when the frame 1 is depressed by the depression of one of the value keys 25 these racks will be caused to engage with pinions 27 associated with the counter wheels to actuate the counter wheels in the manner described in my patent referred to. In the present application the frame 1 is depressed and held in depressed position during the operation of the counter wheels as follows: Associated with each series of cash keys 25 is the forward free end 28 of a lever, the rear portion of which is pivotally connected with a cross rod 29 supported from the side frame members (see Figs. 9 and 10). The portion 28 of this lever stands in the path of movement of lateral pins 30 on the keys so as to be depressed when any key is operated and the lever has a nose 32 which projects above a cross rod 33 on the frame 1. The value keys as well as the other special keys are held in depressed position by detent plates, one for each series of keys. Each of these detent plates is indicated at 34 and has a series of inclined projections 35, one for each key, with which the pins 30 cooperate. The lower ends of the inclines terminate in forwardly projecting slots or recesses 36 to receive the pins and thus hold the keys in depressed position; a spring 37 attached to a tail on the detent plate and to a stationary point of the frame normally pulling the detent plate rearwardly. Each of the detent plates is released near the end of the movement of the full-stroke plate 15 corresponding thereto and to that end each of the full stroke plates is provided with a lateral projection 38 arranged to contact with a downwardly projecting portion 34' on the detent plate to project the detent plate forwardly against the tension of its spring until the pin 30 of the depressed key clears the slot 36, the key then springing upwardly under the impulse of a spring, not shown in the present application.

*Device for throwing the total adder into operative position.*—In my patent referred to the total adder was normally in operative position and a special key was provided for throwing the total adders into inoperative position when it was desired to print the total of the sales of any given transaction. In the present machine, the total adder is normally in inoperative position and is thrown into operative position upon the depression of certain of the special transaction keys, these keys being the cash (CA) key 38 and received on account (RA) key 39. The other special keys are 40 representing the charge (CHG) key, 41 the paid out (PO) key, and 42 the no sale (NS) key, all of these keys being arranged at the left-hand side of the key board shown in Figs. 1 and 29. Each of these keys has a lateral pin 43 and arranged at the side of the series of keys is a plate 44 provided with a series of inclined slots 45 (Figs 1 and 13).

The rear inclined faces of the slots normally stand in the path of the pins 43 on the keys so that when a key is depressed the plate will be moved rearwardly. The inclination of the slots associated with the RA and CA keys is greater than the inclination of the slots associated with the other special keys so that depression of either of the RA or CA will move the plate a greater distance rearwardly than the depression at either of the other keys. The sub-frame 6 as before stated is slidably connected with the tiltable frame 1 so as to be movable laterally and this sub-frame is normally held to the left as shown in Fig. 1 by a spring 46' one end of which is connected to a stationary pin on the side of the frame and the other end to a pin 46 on one arm 47 of a bell crank lever which is pivoted as at 48 to a bracket 49 which is supported by the side frame member. The other arm 50 of the bell crank lever is bifurcated and straddles a pin 51 projecting upwardly from a lateral projection 52 on the sub-frame 6.

The rear end of the plate 44 has a lateral projection 53 located on the forward side of the pin 46, but sufficiently removed therefrom so that when a NS, PO or CHG key is depressed the bell crank lever will be unaffected by the rearward movement of the slide 44. When the RA or CA key is depressed, however, the greater inclinations of the slots in the plate 44 associated with those keys will project the plate rearwardly a greater distance causing the projection 53 to strike the pin 46, rock the bell crank lever and thereby slide the sub-frame to the right so as to cause the pinions of the total adding wheels to be engaged with the racks 24 of the counter operating plate 16.

INTERLOCKING MECHANISM

*Lock for main operating lever (Figs. 13 to 20).*—The main operating lever 7 is normally unlocked, but is arranged to be locked upon the depression of a special transaction key and clerk's key and to be again unlocked upon the depression of a value key. The series of clerk's keys are indicated by the reference character 54 and there is associated with the clerk's and with the transaction keys a set of the actuating devices which have been heretofore designated as the counter operating plate, stop plate and the full-stroke plate, which correspond in all respects with the devices associated with each series of value keys with the exception that the counter operating plate has no rack teeth on its upper side as it is not called upon to operate a counting wheel. 55 represents a locking member secured fast to a cross-shaft 56 which is suitably journaled in the side frame members. This locking member has a rearwardly projecting tail 57 and an upwardly projecting arm 58. The upper end of this arm has a rearwardly inclined surface 59 and the forward edge thereof has a recess 60. Another locking member is indicated at 61 which is loosely mounted upon the shaft 56 and has a rearwardly extending tail 62 and an upwardly projecting arm 63.

The upper end of this arm 63 has a vertical slot 64 and the forward side a recess portion 65. The actuating device associated with the special transaction keys has the pivot pin 18 for the latch provided with a lateral extension 18' as shown in Fig. 1 and in the normal condition of the machine both of the tails 57 and 62 stand in the position shown in connection with the tail 57 in Fig. 16. The plate 44, previously described as being associated with the special transaction keys has a laterally projecting pin 66, which in the undepressed condition of the special keys stands immediately forward of the arms 58 and 63 of the locking members. When any one of the special keys is depressed, however, excepting the no sale key, the plate 44 is projected rearwardly in the manner previously described and the pin 66, striking the arms of the locking members, rocks the tails 57 and 63 to the position indicated in Fig. 18 which brings them in the path of the lateral projection 18' to thus lock the full-stroke plate of the actuating devices associated with the special keys and consequently lock the main operating lever 7.

There is associated with the series of clerk's keys a long lever 67 (Fig. 16) which is constructed in a similar manner to the levers 28 previously described as being associated with the value keys for the purpose of depressing the counter frame. The lever 67 has a portion 68 which extends beneath the pins 54' of the clerk's keys and also has a laterally projecting pin 69 which lies over the face 59 of the locking member 55. When a clerk's key is depressed and the lever 67 rocks downwardly, the pin 69, striking the bevelled face 59 rocks the tail 57 to the position indicated in Fig. 19 and consequently unlocks the main operating lever so far as the clerk's keys are concerned. The main operating lever, however, is still locked by the tail 62 of the locking member 61, but is arranged to be unlocked by this locking member upon the depression of a value key 25. It will be remembered that when the value key is depressed the counter frame is tilted. This counter frame carries a laterally projecting pin 70 (Figs. 13—20) which lies above the slot 64 of the locking member 61 when in locking position and when the counter frame is tilted by the depression of a cash key this pin 70 entering the slot tilts the locking member 61 to bring the tail 62 to the position shown in Fig. 20 and thereby completely unlock the main operating lever.

When the main operating lever is drawn forward the depressed keys are released by the detent plates previously described and the operating plate 44 and the counter frame permitted to return to normal position, thus releasing the locking members and permitting them to return to their normal positions.

*No sale key release of lock.*—When the no sale key is depressed, however, the tail 62 of the locking member 61 is thrown to complete unlocking position as illustrated in Fig. 15. This is accomplished by providing the arm 63 with a lateral pin 71 which stands beneath a bevelled face on a wing 72 projecting from the no sale key. The operating plate 44 is moved rearwardly by the depression of the no sale key so as to throw the tail 57 of the locking member 55 to the locking position indicated in Fig. 18 which in turn is thrown to unlocking position upon the depression of a clerk's key in the manner previously described.

By this locking mechanism it will be seen that it will be necessary to depress a special key, a clerk's key and a value key before the machine can be operated upon all those manipulations which contemplate the registration of the transaction upon the total adder, with the exception of a no sale transaction, in which case the main operating lever is released by the depression only of the no sale key and a clerk's key.

*Lock for transaction and clerk's keys.*—Means are provided for locking the special keys and clerk's keys upon the depression of a value key. When a value key is depressed and the counter frame 1 tilted the lateral pin 70 thereon is projected to the rear side of the arms 58 and 63, as indicated in dotted lines in Fig. 13, which locks the locking members 55 and 61 and consequently the transaction and clerk's keys by reason of the fact that the locking of these locking members will likewise lock the sliding plate 44 through the pin 66 and the lever 67 through the pin 69. By thus locking the special and clerk's keys after depression of a value key the machine can be used as an adding machine or used for adding up the items of different transactions without the danger of the operator becoming confused after he depresses a value key and manipulates one of the transaction or clerk's keys.

*No sale lock for value keys.*—When the locking member 61 is thrown to unlocking position shown in Figs. 15 and 17 upon depression of the no sale key the upper surface of the forward wall 64' of the slot 64 is brought in line with the lateral pin 70 of the tiltable carriage so as to prevent downward movement of this carriage and consequently lock the value keys.

*Devices to lock mechanism after beginning of and until complete depression of value keys.*—Referring to Figs. 9, 10 and 11, the rear end of the detent plate 34 associated with each series of value keys is provided with a recess or slot 72 to receive the free end of one arm 73 of a bell crank lever pivotally mounted upon the cross shaft 56. The other arm 74 normally stands in the position shown in full lines in Figs. 9 and 10 and in dotted lines in Fig. 11, but when a value key is depressed and the detent plate thereby slid forwardly while its pin 30 is riding down the incline of the projection 35, the bell crank lever is rocked to project the free end of the arm 74 into the path of an extension 38′ of the lateral projection 38 on the full stroke plate 15 thereby locking the main operating lever. So soon as the pin 30 of the depressed key coincides with the slot 36 at the lower end of the incline the detent plate 34 is projected rearwardly by the spring 37 thereby rocking the bell crank lever to its normal unlocking position.

*Detents for stop plates.*—Each of the stepped stop plates 17 is held in its initial position by a detent 75 (see Figs. 4, 9, 10 and 12). This detent engages a slot 76 on the under side of the stepped plate 17. The detent has an arm 77 provided with slots 78 to receive screws 79 on a supporting plate 80 and a spring 81 attached to a pin 82 on the arm and to a screw 83 on the supporting plate normally holds the detent in latched position. In the case of the value keys the detents lie beneath the levers 28 while in the case of the transaction keys and the clerk's keys the detents lie beneath the corresponding lever 67 so that whenever a key in any series is depressed the lever corresponding to that series will be correspondingly depressed and release the detent from the stop plate corresponding to that series of keys. For that series of keys in which no key has been depressed the stepped plate will be held locked and will act to cause the full stroke plate to be released therefrom in the manner previously described and shown in Figs. 4 to 8 inclusive.

*Printing mechanism.*—The printing wheels are shown at 84 in Fig. 1, being mounted upon a shaft 85 (Fig. 21). The plates 16 each have a forward extension 86 provided with rack teeth 87 which mesh with the pinion 88 on a shaft 89 (Fig. 9). Each of these shafts 89 projects beyond the frame on the printer side of the machine and has a pinion 90 which operates a rack 91. The rack 91 has connected therewith another rack 92 which meshes with a pinion 93 of the printer wheel corresponding thereto so that the printing wheels will be rotated to represent an amount corresponding to the amount of the transaction. Paper and carbon are fed from the rolls 94, 95 and 96 over a roll 97, thence through a slot in the top cover, (Fig. 29), thence beneath the type wheels, thence through another slot (not shown) in the top cover and thence to a paper tear-off roll and a take-up roll, the details of which will be more fully described hereinafter. A hammer 98, which may be provided with a felt pad, is pivoted at 99 and has a lateral extending pin 100 at its free end which operates in a slot 101 in a slidably mounted plate 102 (Figs. 21 and 23). The slot 101 is upwardly and rearwardly inclined at its rear end as indicated at 103. The plate 102 has two other slots 104 and 105 which straddle the pivot pin 99 and also a shaft 106 hereinafter referred to so as to support and guide the plate. Means are provided for throwing this operating plate 102 into operative connection with the main operative plate 9, previously described as being slidably moved by the main operating lever 7. The pin 11 which cooperates with the curved slot 10 of the lever 7 is projected through a slotted opening 107 Figs. 2 and 21 in the side frame member, and pivotally connected to the plate 102, as at 108, is a latch 109, having its free end provided with a recess 110 to receive the pin 11 when the latch is swung upwardly by the means to be described. The latch is normally pulled to disengaged position by a spring 111 having one end attached to an arm 109′ upon the latch and the other end attached to the plate 102.

Two separate means are employed for swinging this latch into engagement with the pin 11. One of these means is operated by the cash keys and the other means by the special keys. The cash key controlling devices will first be described. The plate 112 shown in detail in Fig. 22 has a pair of slots 113 and 114 which straddle a stud 115 and the rock shaft 56 projecting laterally from the side frame member, the shaft 56 containing a series of spacers 117 for the racks 91. This plate 112 has a rack 118 meshing with a pinion 120 on a shaft 121 which is supported by the side frame members, as shown in Fig. 24. The shaft 121 has a pair of pinions 122 in engagement with a pair of curved racks 123 (Fig. 3) which depend from the counter wheel frame and have connected therewith one end of coil springs 123′ which have their opposite ends connected with the shaft 29 to return the counter carriage to normal position. As a result of this construction whenever the counter carriage is depressed by a value key the shaft 121 will be rotated and project the plate 112 rearwardly. This plate 112 has a cam face 124 which engages a pin 125 on the free end of the latch 109 and thus throws said latch upwardly to engage it with the pin 11. When the main operating lever 7 is pulled forwardly therefore the plate 102 will likewise be projected forwardly and when the lateral pin 100 on the hammer reaches the incline 103 it will be projected upwardly to force the paper against the type wheels. A series of slots 98′ on the under side of each of the racks 92 cooperate with the forward edge of the hammer to hold the type wheels against movement during the printing operation.

The means for throwing the printing mechanism into operative position by the special keys will now be described. The shaft 56 referred to, it will be remembered, is the shaft to which is secured the locking member 55, operated by the clerk's keys, and it will be recalled that each time a clerk's key was depressed this locking member was moved and the shaft 56 thereby rocked. The shaft 56 on the outside of the frame member has connected therewith a crank arm 126 (Fig. 21) which is pivotally connected as at 127 with the forward end of a plate 128. The plate 128 has a projection 129, the upper side of which is formed with an incline 130, at the lower end of which the pin 125 of the latch 109 normally lies. As a result of this construction, when a clerk's key is depressed and the shaft 56 is locked, the plate 128 is projected rearwardly, causing the pin 25 to ride up the incline 130 and thereby raise the latch into engagement with the pin 11, the operation of the printing thereafter being as previously described.

*Paper spacing devices.*—(Figs. 21, 24 and 26.)—The paper roll for the permanent records is fed by the feed rolls 139' and 140' and is wound upon the sleeve 131, loose on the stud or shaft 131', a rotary movement being imparted to the feed rolls and sleeve upon the return movement of the main operating lever 7. The plate 102 previously referred to has a rack 132 which is meshed with a pinion 133 loosely mounted upon the stud 134. This pinion has fastened thereto a disk 135 carrying a spring-pressed pawl 136 cooperating with a ratchet wheel 137 fast to a shaft 138. The shaft 138 has a gear 139 which drives a train of gearing 140, 141, 141', 142 and 143, the latter gear being loose on the shaft 131', and being connected to the sleeve 131 in the manner to be later described, and the gears 139 and 140 being connected to the feed rolls. The pawl 136 has a laterally projecting pin 144 which normally rides about a circular track 145 carried by an arm 146 pivoted on the stud 147 which carries the gear wheels 141 and 141'. This track is cut away at one portion of its periphery, indicated at 148, to allow the pawl to engage the ratchet wheel and impart to the same a partial revolution which serves to cause the feed rolls to feed the paper sufficiently to provide a proper space between the items entered upon the same by the printing wheels. After the total of the items has been printed, however, it is desired to feed the paper a greater distance so as to provide ample space to enable the upper strip of paper to be torn off. It will be remembered that the items of any transaction are first set down and added by the depression of the cash keys alone and that thereafter the total is printed by depressing a transaction key, a clerk's key and the value keys representing the total as indicated on the total adding wheels. When this is done the track for the pawl is thrown out of operative position so that the pawl will engage the ratchet wheel for the full time of its stroke. The plate 128, which, it will be recalled, is controlled by the special keys, has a slot 149 into which extends the pin 150 on the arm 146 which carries the track so that when the plate 128 is projected rearwardly the arm will be thrown to the position shown in dotted lines Fig. 26 and thereby permit the pawl to engage the ratchet wheel for its full stroke and thereby cause the feed rolls to move the paper a sufficient distance to provide a wide space between the items of different transactions.

*Compensating device for paper take up roll.*—(Figs. 24 and 27.)—The sleeve 131 has a pair of diametrically opposite longitudinally-extending grooves 151 into which is fitted a spring clamp 152 to secure the end of the paper to the sleeve. The inner end of the sleeve has secured thereto a serrated wheel 153 and cooperating with the serrations of this wheel is a pin 154 extending laterally from an arm 155 pivoted to a disk 156 as at 157 and normally impelled by a spring 158 to hold the pin 154 against frictional engagement with the serrations of the wheel 153. The disk 156 is secured to the gear 143 so as to rotate therewith. The disk 156 is formed with a recess 159 to accommodate the pin. As a result of this construction, as the diameter of the paper roll increases, and thereby places a tension upon the paper strip, the pin 154 will slip over the periphery of the serrated wheel 153 so as to permit the full movement imparted to the disk 156 by the pawl 136, but allow the sleeve to remain stationary after it has taken up the paper fed by the feed rolls.

*Drawer release.*—(Fig. 28.)—The cash drawer 160 is slidably mounted in a casing 161 upon which the registering and printing mechanism sits. A spring 162 at the rear of the drawer normally tends to impel the same outwardly and a detent 163 having a shoulder 164 cooperating with a stop 165 holds the drawer in closed position, the detent being pivoted to the under side of the casing top at 163'. The forward end of the detent has an upturned end 166. Means are provided for releasing this detent upon the depression only of a special key so that the value keys may be manipulated to add on the total counter without disturbing the cash drawer. There is formed in the main operating lever 7 an arcuate recess 167. A lever 168 has a slot 168' to receive a pin 169' at the upper end of a slide 169, the slide being provided with slotted openings to receive the pins 170 on the frame. One end of this lever has a lateral pin 171 which normally stands in line with the recess 167. The other end of this lever is pivotally connected to a crank arm 172 on the shaft 56. It will be recalled that when the clerk's key is depressed this shaft 56 is rocked through the medium of the locking device 55. Upon the rocking of this shaft the pin 171 is projected in the path of the wall 173 of the slot 167 so that when the main operating lever is pulled forwardly the lever 168 will be depressed thereby depressing the slide 169, which has a foot 169' which contacts with the upwardly extending end of the detent, thereby causing the detent to release the cash drawer which is impelled outwardly by the spring 162.

*Bill holder.*—(Fig. 28.)—The cash drawer has a receptacle for bills and extending across the rear end of this receptacle is a rock shaft 174 to which is pinned one or more spring arms 175. The rock shaft has a pinion 176 in mesh with a rack 177 projecting upwardly from a lever 178 pivoted at 179 to the arm of the cash drawer and having a slot 180 to receive a pin 181 by which it is guided. This lever 178 normally stands at an incline and as the drawer is pulled outwardly the under surface of the lever strikes a plate 182 on the forward portion of the casing, forces the lever 178 upwardly and thereby rocks the shaft 174 and the spring fingers 175 to cause the spring fingers to release the bills in the cash drawer receptacle. Each finger has a coil spring 175' connected therewith and to the drawer to hold the free end of the finger in yielding engagement with the bills in the drawer.

*Blind for adding wheels.*—(Figs. 29, 30 and 31.)—A blind 183 normally covers a window 184 in the outer casing, the window being provided to expose the total adding wheels *b* when it is desired to take off the day's total. The detail adding wheels *a* are normally exposed through a window 185, but when the blind is removed from the window 184 it is designed to close the window 185 to obviate any danger of confusion in reading in the event the detail adders have not been reset to zero. The blind projects from a plate 186 having a slot 187 to receive screws 188 by which it is slidably connected with the frame member 5. The rear end of the plate has a projection 189, which, when the plate is in its rearmost position, with the blind covering the window 184, stands immediately back of the bolt 190 of a lock 191 of any suitable construction so that the blind is normally locked, the key hole 192 to the lock being on the outside of the outer casing as shown in Fig. 29. The plate 186 has a finger piece 193 projecting through a slot 194 just beneath the lid of the outer casing by which the blind may be slid from one position to another.

The claims for the interlocking mechanism have been made the subject matter of my Letters Patent No. 1,628,420, dated May 10th, 1927. The claims for the drawer opening mechanism have been made the subject matter of a divisional application filed August 21, 1925, Serial No. 51,598.

Having thus described my invention I claim:

1. In a combined cash register and adding machine, normally unlocked actuating devices, total adding mechanism normally disconnected from said actuating devices, detail adding mechanism also normally disconnected from said actuating devices, a series of value keys for determining the registrations on said mechanisms, a special transaction key, means operated by the value keys to connect said detail adding mechanism with said actuating devices and to place said total adding mechanism in a position to be engaged with said actuating devices, and means operated by said special transaction key to connect said total adding mechanism with said actuating devices.

2. In a machine of the character described, a movable frame having counting wheels, a series of stop keys, actuating devices comprising a full-stroke plate, a counter operating plate, and a stop plate, said counter operating plate and stop plate being capable of a limited relative movement, a pivoted latch carried by said full-stroke plate, a pivoted pawl carried by said counter operating plate, the free end of said latch being normally engaged with the hub of said pawl to lock the plates together, and means when said stop plate has been arrested by a depressed key for swinging said pawl into engagement with said latch to release the same from the hub thereof.

3. In a machine of the character described, a movable frame having counting wheels, a series of keys, actuating devices for said wheels comprising a full-stroke plate, a counter operating plate and a stepped stop plate, said counter operating plate and said stepped plate being connected together but capable of a limited movement relatively to each other, a pivoted latch carried by said full-stroke plate, a pivoted pawl carried by said counter operating plate, and cooperating shoulders between said stepped plate and said pawl whereby when said stepped plate is arrested by a depressed key, the shoulders will contact and cause the pawl to be swung against said latch to release said full-stroke plate from the other plates.

In testimony whereof I have hereunto set my hand this 10th day of September, 1923.

WILLIAM LEONARD PADEN.